United States Patent
Bonham et al.

(10) Patent No.: US 7,422,098 B2
(45) Date of Patent: Sep. 9, 2008

(54) SAW TOOTHED MERGING CONVEYOR AND METHOD

(75) Inventors: Boyce Dean Bonham, Bono, AR (US); Paul Dewayne Wallace, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 230 days.

(21) Appl. No.: 11/256,247

(22) Filed: Oct. 21, 2005

(65) Prior Publication Data
US 2006/0086590 A1    Apr. 27, 2006

Related U.S. Application Data

(60) Provisional application No. 60/621,155, filed on Oct. 22, 2004.

(51) Int. Cl.
*B65G 47/68* (2006.01)

(52) U.S. Cl. .................. 198/447; 198/453; 198/370.02

(58) Field of Classification Search ................ 198/447, 198/372, 369.4, 436, 370.02, 370.06, 370.09, 198/452, 453, 539, 600
See application file for complete search history.

(56) References Cited

U.S. PATENT DOCUMENTS

| | | | |
|---|---|---|---|
| 3,219,166 A * | 11/1965 | Collins et al. | 198/370.04 |
| 3,279,583 A * | 10/1966 | Abegglen | 198/370.09 |
| 4,044,897 A | 8/1977 | Maxted | |
| 4,974,719 A | 12/1990 | Chenevard | |
| 5,052,541 A | 10/1991 | James et al. | |
| 5,117,961 A | 6/1992 | Nicholson | |
| 5,501,315 A | 3/1996 | Loomer | |
| 5,551,543 A | 9/1996 | Mattingly et al. | |
| 5,653,325 A | 8/1997 | Enomoto | |
| 2002/0121423 A1 | 9/2002 | Warnecke | |

* cited by examiner

Primary Examiner—James R Bidwell
(74) Attorney, Agent, or Firm—Alston & Bird LLP

(57) ABSTRACT

A sawtooth merging conveyor system that more accurately controls the position of merging cartons or other objects of varying size, shape, weight or condition. Rollers define entry portions configured to abut supply conveyors and a conveyor belt covers a main portion of the conveyor system. The rollers of the entry portions convey the cartons from the supply conveyors onto the conveyor belt. Slip of the cartons is reduced by the friction of the conveyor belt surface. The rollers of the entry portions may have a coating that improves roller grip of the cartons and matches the thickness of the belt to reduce slip and improve transitioning of the cartons onto the belt. A guide rail defines an outer edge of the entry portions and can includes a plurality of guide rollers connected to the main conveyor drive to urge packages onto the conveyor belt of the main portion.

21 Claims, 6 Drawing Sheets

SAW TOOTHED MERGING CONVEYOR AND METHOD

CROSS-REFERENCE TO RELATED APPLICATION

The present application claims priority from U.S. Provisional Application No. 60/621,155 entitled SAW TOOTHED MERGING CONVEYOR AND METHOD filed Oct. 22, 2004, the contents of which are incorporated herein by reference.

BACKGROUND OF THE INVENTION

1. Field of the Invention

The present invention is directed to conveyor systems, and more particularly to merging conveyor systems.

2. Description of Related Art

Conveyor systems are used to transport goods, packages, cartons and other objects in all types of environments and experience heavy use in the manufacturing and shipping industries. Complex conveyor systems typically require the merging of several conveyor lines into one main line. As such, apparatuses for the effective merging of cartons from multiple conveyor lines are important to the conveyor industry. Of additional importance is the ability to create and control gaps between cartons in order to facilitate sorting.

To effectively merge a package from a merging conveyor line onto the main conveyor line, the merging conveyor typically abuts the main line in such a manner as to allow the transfer of cartons from the merging line to the main line. Conventional merging conveyor systems include "spur" merges and "sawtooth" merges. A typical spur merge includes a roller merge line that abuts a roller main line at an angle acute to the direction of the main line. The axis of the rollers of both the main line and the spur line are perpendicular to the direction of their travel, respectively.

A typical sawtooth merge includes a belt merge line that abuts a roller main line at an angle acute to the direction of travel of the main line. However, unlike a spur merge, the main line has a triangular sawtooth area that projects out from the main line so as to accommodate the end of the belt merge line. The sawtooth area is created by extending the main line rollers that are adjacent the sawtooth into the sawtooth area.

In order to create and control gaps between cartons on the main line of a conveying system, typical conveyor systems employ a separation station. This may include a series of conveyor sections with progressively increasing speeds. Cartons that reach the faster conveyor sections first are pulled ahead of the cartons behind them due to the differences in velocity. The delays on the slower conveyor sections between cartons create bigger gaps between the cartons on the faster conveyor sections.

Controlling gaps between cartons is also advantageous at the merging area. In order to control such gaps in typical merge systems, pop-up stops, brake rollers, brake belts or other similar traffic control devices are used. Despite the use of these devices, however, there remains a problem in controlling the positioning of cartons. Oftentimes, a conveyor must accommodate assorted cartons, including cartons that are not uniform in size, shape, weight or condition. When traveling on a typical roller line, non-uniform cartons do not travel at the same speed due to slippage between the contacting surface of the carton and the surface of the rollers. This necessitates the need for a separation station downstream from the merging area.

Thus, there remains a need for a merging conveyor system that can accurately control the position of cartons from the merging line to the main line. Such positional control can enable the conveyor system to run more efficiently and can eliminate the need for a separation station downstream from the merging area.

BRIEF SUMMARY OF THE INVENTION

The present invention addresses the above needs and achieves other advantages by providing a sawtooth merging conveyor system that more accurately controls the position of merging cartons or other objects of varying size, shape, weight or condition. The conveyor system includes rollers that define entry portions configured to abut supply conveyors and a conveyor belt that covers a main portion. The rollers of the entry portions convey the cartons from the supply conveyors onto the conveyor belt. Slip of the cartons is reduced by the friction of the conveyor belt surface so that the cartons maintain their relative positioning on the conveyor belt. In addition, the rollers of the entry portions may have a coating that improves roller grip of the cartons and matches the thickness of the belt to reduce slip and improve transitioning of the cartons onto the belt. In another aspect, a guide rail defining an outer edge of the entry portions may include an urging device configured to urge cartons in the direction of the belt on the main conveyor portion.

In one embodiment, the conveyor system includes a support frame and a plurality of main rollers supported by the frame. The plurality of main rollers define a conveying path and a plurality of entry rollers define at least one entry portion. The entry portion is positioned adjacent to the conveying path and angled with respect to the path. A belt extends over at least a portion of the plurality of main rollers that define the conveying path and is configured to convey objects along the path. Additionally, the entry portion is configured to receive objects and to convey the objects onto the belt for conveying along the conveying path. Preferably, the entry rollers are integrally connected with the main rollers so as to be mutually rotated by a drive system.

In one aspect, the belt defines a conveying surface and the entry rollers also define a conveying surface wherein the conveying surfaces have substantially coplanar, adjacent surface portions. To achieve the coplanar adjacent surface portions, the belt can have a thickness that is substantially the same as a surface coating on the entry rollers. In addition, the surface coating may be configured to improve gripping of the objects.

Also, the entry portion can include a guide rail extending along an outer edge of the entry portion and angled with respect to the conveying path. The guide rail includes an urging device configured to urge objects abutting the guide rail onto the belt. For example, the urging device can include a plurality of positively driven guide rollers that urge the objects along the guide rail. The guide rollers extend toward the belt from the guide rail and can be driven by one of the plurality of main rollers defining the conveying path.

The conveyor system of the present invention has several advantages that improve control of the positioning and movement of varying objects on sawtooth conveyors. For example, the conveyor system uses the conveyor belt as the main conveying surface in lieu of rollers. The conveyor belt reduces slip of the objects, especially when constructed of a relatively high friction material. The coating on the sawtooth rollers provides additional grip for the objects and the increased thickness of the coating minimizes hang up of the objects when moving from the entry portion to the conveyor belt. The guide rail and its guide rollers provide additional urging to the objects to ensure steady progress toward the conveyor belt. Objects that have entered the entry portion and are driven toward the guide rail are urged along the guide rail, as opposed to contacting and dragging against the guide rail. Driving the guide rollers with the same drive system driving the main conveyor portion obviates the need for a dedicated drive system for the guide rollers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
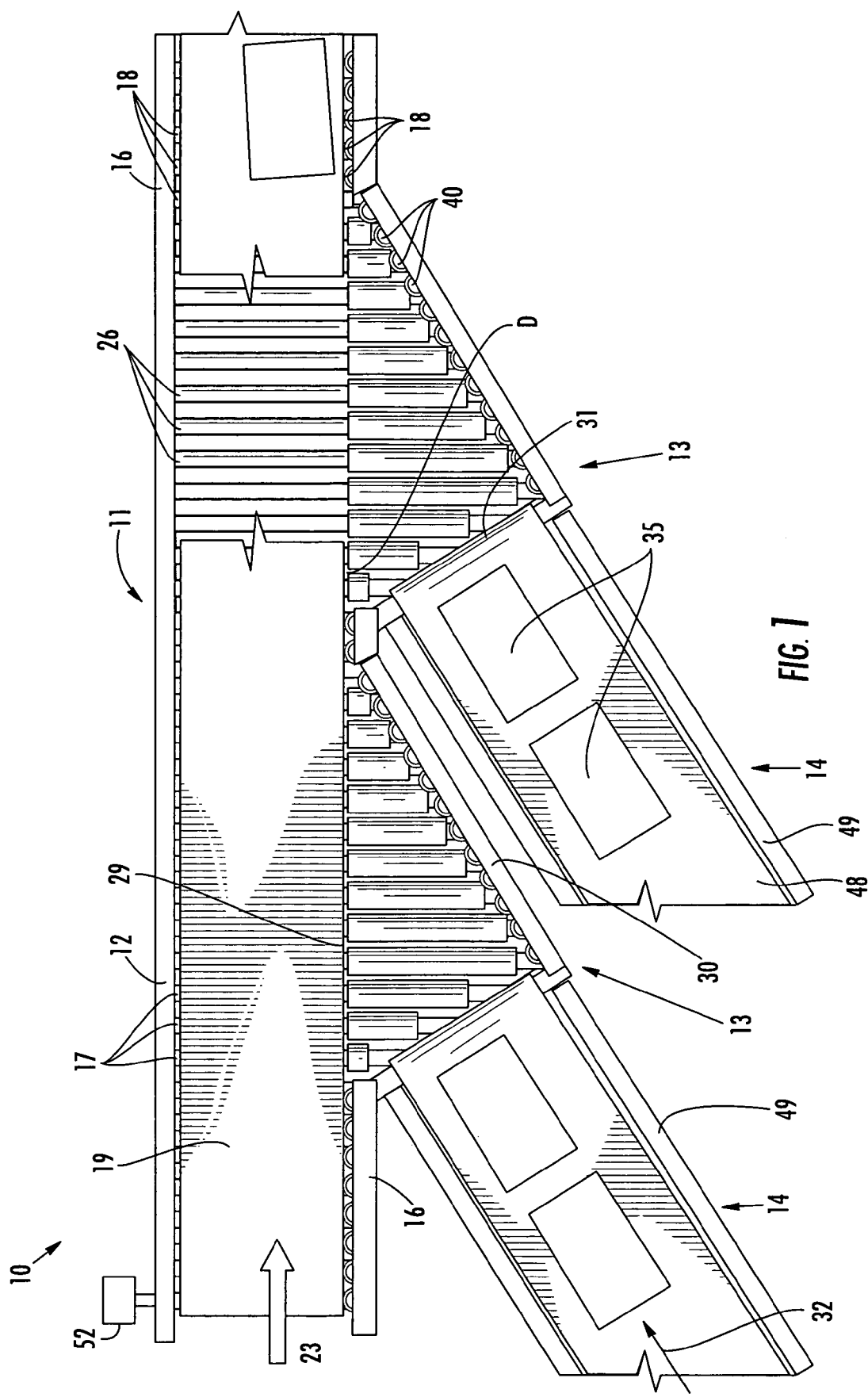
FIG. 1 shows a plan view of a sawtooth conveyor system of one embodiment of the present invention.

Generally, a merging conveyor system 10 of one embodiment of the present invention includes a main conveyor portion 11, at least one sawtooth entry portion 13 (in the illustrated embodiment two sawtooth portions) and a support frame 12, as shown in FIG. 1. A supply conveyor 14 abuts each of the one or more sawtooth or entry portions 13. Such positioning allows the supply conveyor 14 to deliver objects 35 to the sawtooth or entry portion 13 for movement thereby onto the main conveyor portion 11, and further conveyance with other objects 35 along a downstream conveyor path of the conveyor system 10.

The term "objects" as used herein denotes any type of conveyable objects including boxes, bins, mail, packages, cartons, assemblies on an assembly line, etc. The objects can vary in size, weight and shape and, advantageously, still be effectively merged in a predicable manner by the conveyor system 10 of the present invention. The illustrated embodiment includes two entry portions 13 positioned on one side of the main conveyor portion 11, however, more or less entry portions may be employed with varying spacing and position. For example, an additional entry portion 13 may be positioned opposite the two illustrated entry portions 13. Further it should be noted that the term "sawtooth" as used herein should not be interpreted as being limited to any particular shape, or triangular shape, or number of adjacent shapes.

Figure 5:
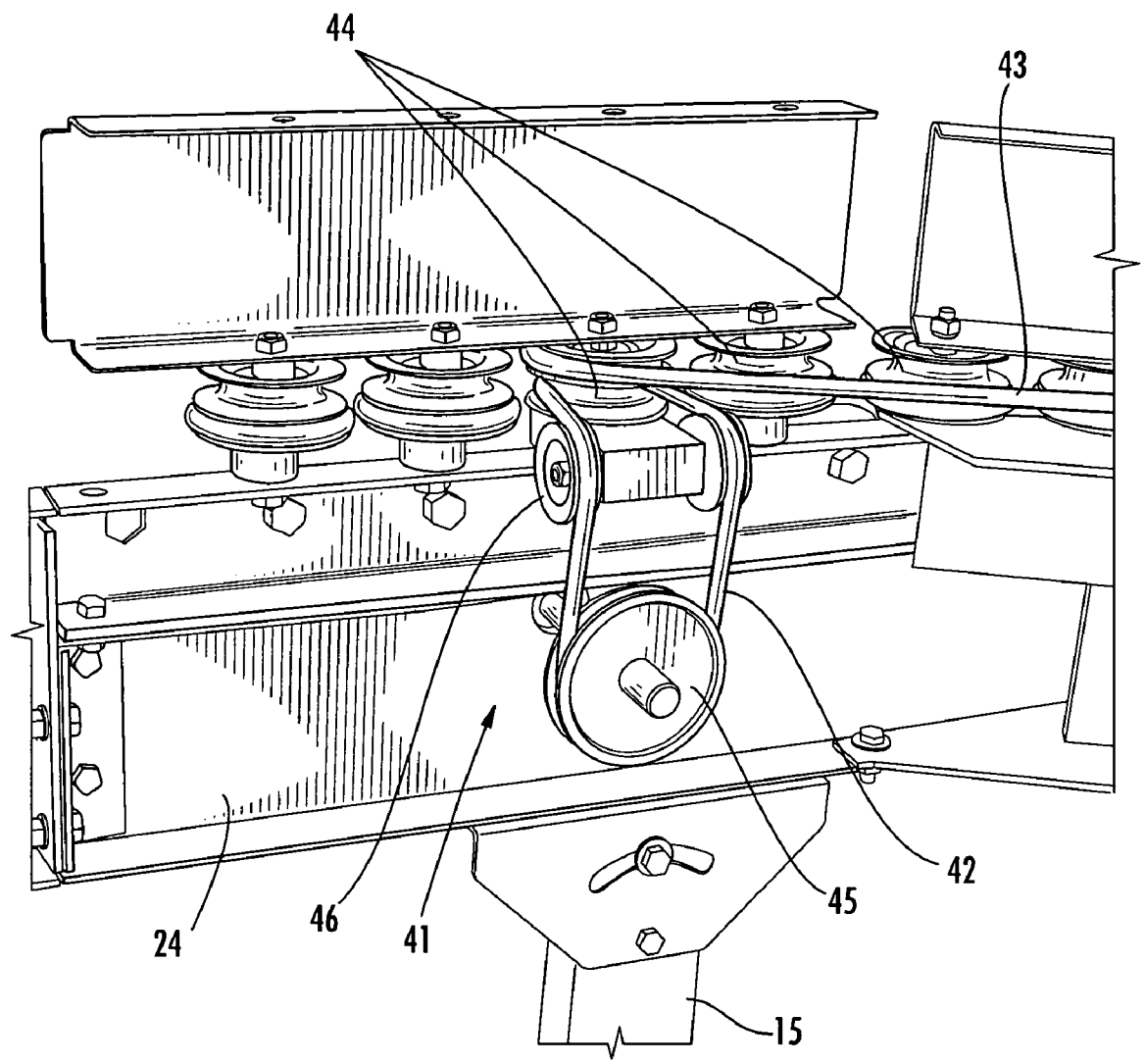
FIG. 5 shows another perspective view of the guide rollers of the guide rail of the conveyor system of FIG. 1.

As indicated, the conveyor system 10 includes a support frame 12 that supports the main conveyor portion 11 and the sawtooth entry portion 13. As shown in FIG. 5, the support frame 12 includes horizontal support members 24 that extend on each side of the main conveyor portion 11 and on an outer side of the sawtooth entry portion. Preferably, the horizontal support members 24 are constructed of a material of sufficient strength to support the objects 35 and the remaining components of the conveyor system 10. For example, the support member can be constructed of steel, aluminum or plastic rails that are bolted or fastened together to define the outer edges of the conveyor system 10. In addition, the support frame 12 can include a plurality of vertical legs 15 that are attached to and support the horizontal support members 24 using bolts, screws, nails or other fasteners. The plurality of vertical legs 15 are preferably constructed of a material that is similar to those used for the horizontal support members 24. The support frame 12 also includes support members (not shown) that extend under the main and sawtooth entry portions 11, 13 at an angle to the conveying direction.

It should be noted that in other embodiments of the present invention, a wide range of variations in the structure and materials of the support frame 12 is also possible. For example, the horizontal support members 24 of the support frame 12 can be positioned on a floor, so as to not require the plurality of vertical legs 15. Alternatively, the horizontal support members 24 on one side of the support frame 12 can be attached to an existing structure, such a wall, so that the vertical legs 15 could be positioned on the other side of the support frame or the support frame could be supported as a cantilever.

As another alternative, the support frame 12 can be attached to existing structures on both sides, thus removing the need for the plurality of vertical legs. Also, the support frame 12 need not have its own discrete construction and may merely include portions of other structures, such as portions of the main and sawtooth entry conveyor portions 11, 13. Therefore, it should be noted that the support frame 12 includes any range of supporting structures using varying materials at varying positions and orientations that are capable of providing some support to the main and sawtooth entry conveyor portions 11, 13.

In the illustrated embodiment, the main conveyor portion 11 of the conveyor system 10 includes a plurality of main rollers 17, a conveyor belt 19 and several vertical side rails or walls 16, as shown in FIGS. 1 and 5. As shown in FIG. 1, and as will be described in more detail below, sections of the main conveyor portion 11 extend adjacent the sawtooth entry portions 13 wherein a plurality of rollers 26 in the sawtooth entry portions and the main rollers 17 are actually portions of the same rollers. The remaining sections of the main conveyor portion 11 are not adjacent to the sawtooth entry portions, and the main rollers 17 therein are not portions of rollers extending into the sawtooth entry portions 13.

Regardless, the main rollers 17 in the illustrated embodiment are preferably substantially parallel to each other and each have substantially the same diameter and length within the main conveyor portion 11. In particular, the main rollers 17 are attached to the support frame 12 such that each successive roller is in close proximity to, but does not contact, the next adjacent one of the main rollers 17. In the sections of the main conveyor portion 11 not adjacent the sawtooth entry portion 13, the main rollers 17 have roller ends 18 that are spaced apart along, and rotatably fixed to, the horizontal frame members 24 on either side via bearings. As a result, each of the main rollers 17 can rotate about its respective axis. In the sections of the main conveyor portion 11 that are adjacent to the sawtooth entry portion 13, the main rollers 17 are supported in the main conveyor portion at one of the ends 18 by the horizontal frame members 24 and at the other one of the ends by the horizontal frame members in the sawtooth entry portion.

The main conveyor portion 11 preferably includes a drive system, such as one or more motors 52 connected through a reducer and/or a chain drive to one of the ends 18 of the main rollers 17, as shown in FIG. 1. For example, the chain drive may include a sprocket on the end of the motor shaft and sprockets on one of the ends of each of the main rollers 17. The drive system also includes chain loops extending over each adjacent pair of sprockets connecting the sprockets to the motor shaft such that the plurality of main rollers 17 rotate in unison and in the same direction. In the illustrated embodiment, the chain drive is housed within the side walls 16 of the main conveyor portion 11 that are opposite the sawtooth entry portions 13. Other drive systems could also be employed and still be within the purview of the present invention, such as zone drive systems with dedicated motors, or line shaft, or belt or clutch driven systems with a single motor for the entire conveyor system 10. The drive system may also include multiple versions of the motor 52.

Figure 6:
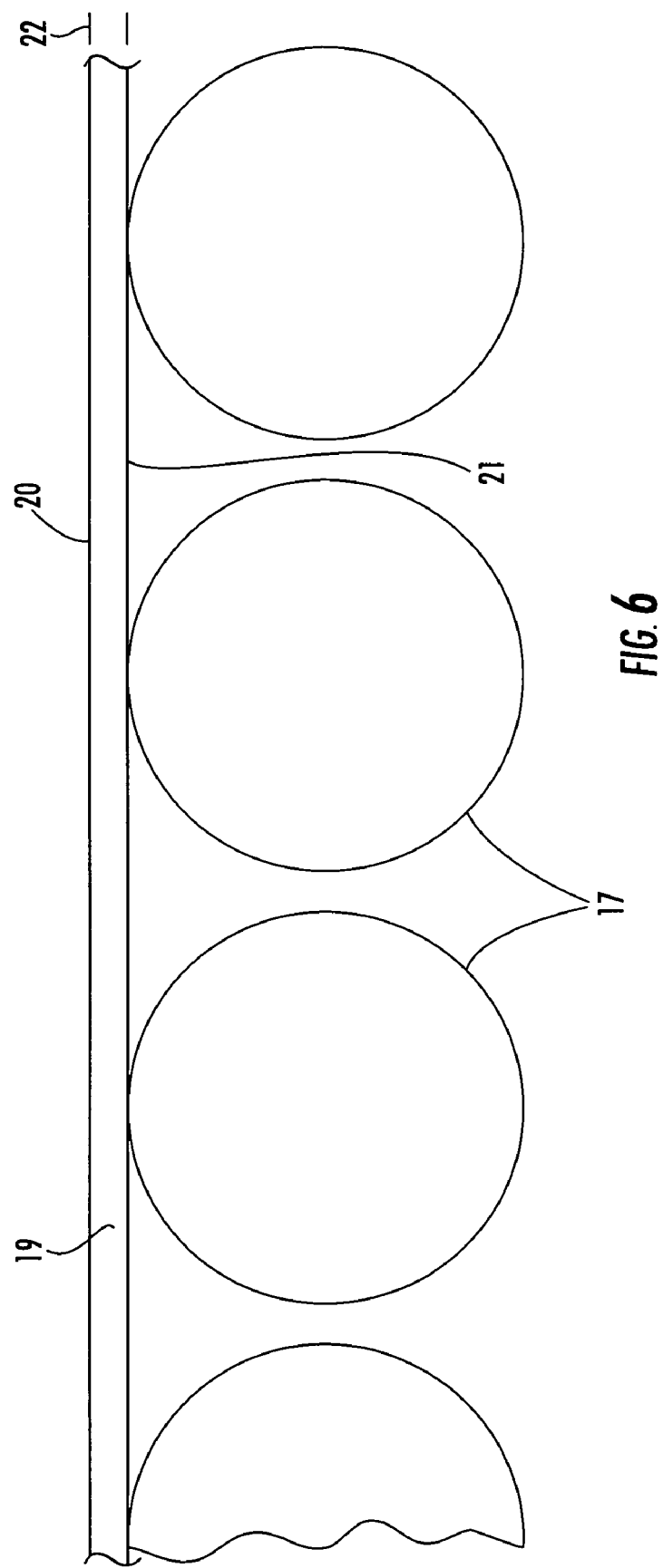
FIG. 6 shows an enlarged view of an edge of a conveyor belt of the conveyor system of FIG. 1.

Also included in the main conveyor portion 11 is a conveyor belt 19 made of a material, such as a rubber or polymeric material, preferably with sufficient friction to grip and convey objects 35 along a conveying direction 23. Generally, the conveyor belt 19 includes a top conveying surface 20, a bottom conveying surface 21, and a thickness 22 defined between the surfaces as shown in FIG. 6.

In the illustrated embodiment, the conveyor belt 19 is positioned between the vertical side walls 16 of the support frame 12 and extends over the plurality of main rollers 17, as shown in FIG. 1. As a result, the bottom surface 21 of the conveyor belt 19 contacts, and is driven in the conveying direction 23, by the plurality of main rollers 17, as shown in FIG. 1. In this configuration, the plurality of main rollers 17 support as well as urge the conveyor belt 19 along the conveying path.

Preferably, the coefficient of friction of the top conveying surface 20 is such that objects 35 are transported with minimal slip by the top conveying surface 20 when the objects 35 are in contact with the top conveying surface 20. The coefficient of friction of the bottom surface 21 of the conveyor belt 19 is preferably such that the conveyor belt 19 is propelled by its contact with the plurality of main rollers 17 as they are rotated by the drive system described above. The conveyor belt 19 of the illustrated embodiment has a flat surface, but could also be adapted to different shapes, such as by having a trough shape or a crown wherein the underlying main rollers 17 have angled, adjacent rollers, or it could be constructed of segmented plastic panels.

It should be noted that in other embodiments of the present invention, the conveyor belt 19 could be driven and supported without the plurality of main rollers 17. For example, a drive drum and idler may be positioned at opposite ends of the conveyor belt 19 wherein only belt tension, or a flat, underlying surface, supports the conveyor belt at its operational height. Further, it should be noted that the entire length of the main conveyor portion 11 need not be entirely covered by the conveyor belt 19, but could include several belts interspaced with the main rollers 17 or some other type of motivated or unmotivated conveying surface. Also, although the main conveyor portion 11 is illustrated in the figures as being rectangular in shape with straight edges, the main conveyor portion can round corners, extend up and down grades, split into other conveyors, abut the sawtooth entry portion 13 of another conveyor sytem 10, etc., and still be within the scope of the present invention. Advantageously, the use of such belts equalizes the speed of travel for objects 35 of different size, weight and composition as they are urged onto the belt by the sawtooth entry portion 13.

Figure 2:
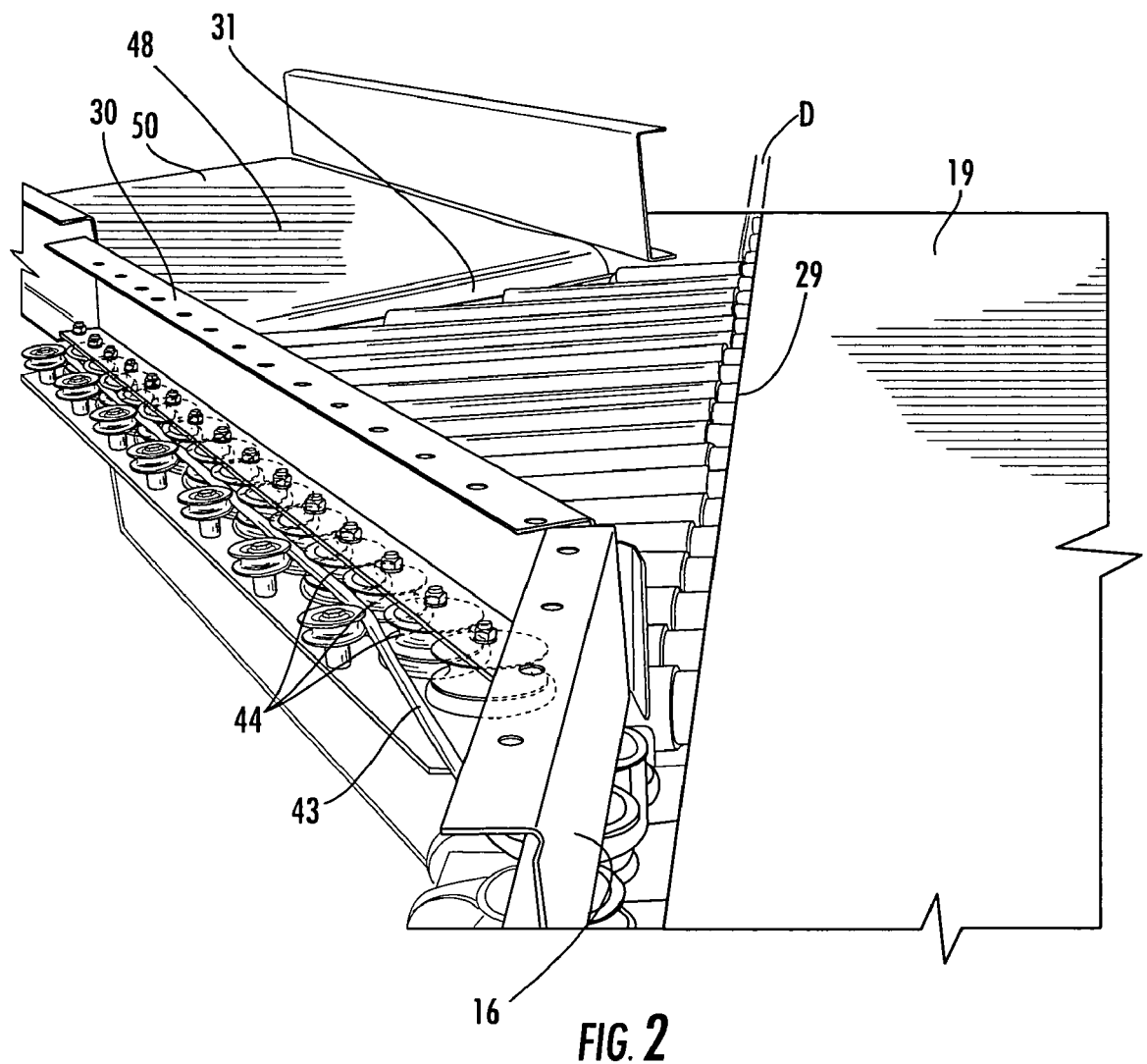
FIG. 2 shows a perspective view of a sawtooth merge area of the conveyor system shown in FIG. 1.

The sawtooth or entry portion 13 projects laterally outward from the main conveyor portion 11 and, in the illustrated embodiment, is generally triangular in shape, as shown in FIGS. 1-4. In particular, a conveyor belt merge edge 29 extends along the main conveyor portion 11 and defines one side of the sawtooth or entry portion 13, a guide rail 30 defines another side, and a supply conveyor end 31 defines the third side, as shown in FIG. 2. The orientation of the three sides is such that a merge direction 32 of travel for the objects 35 intersects the main conveying direction 23 at an acute angle, wherein the conveyor belt merge edge 29 is substantially parallel to the main conveying direction 23, the supply conveyor end 31 is substantially perpendicular to the merge direction 32, and the guide rail 30 is substantially parallel to the merge direction 32.

It should be noted that the present invention also includes varying shapes for the sawtooth or entry portion 13. For example, the sawtooth or entry portion can be defined by non-linear sections wherein the guide rail 30 has the shape of an arc or includes several angled surfaces. Additionally, the merge direction 32 can intersect the conveying direction at various angles. For example, the merge direction 32 can be nearly perpendicular to the main conveying direction such that the sawtooth or entry portion 13 has a substantially rectangular shape. Alternatively, the merge direction 32 can intersect the main conveying direction 23 at an obtuse angle such that the sawtooth or entry portion 13 is again triangular in shape, however a component of the merge direction 32 is opposite the main conveying direction 23 in this configuration. The merge edge 29 can also have varying shapes and orientations to match the end of the conveyor 14 supplying the objects 35 for merging.

The sawtooth or entry portion 13 also includes the plurality of sawtooth rollers 26, as initially described above. Preferably, the plurality of sawtooth rollers 26 are of a material, diameter, and spacing that is similar to the plurality of main rollers 17 of the main conveyor portion 11 due to their preferred integral connection with the main rollers 17. However, the length of the plurality of sawtooth rollers 26 is preferably varied so that the area defined by the sawtooth rollers conforms to the triangular (or other shaped) area defined by the conveyor belt merge edge 29, the guide rail 30, and the supply conveyor end 31. In the illustrated embodiment, the plurality of sawtooth rollers 26 are also driven by the same motor 52 and at the same rotational speed as the plurality of main rollers 17 by virtue of their integral construction. The sawtooth roller ends 18 are rotatably fixed to a plurality of bearings supported by the adjacent horizontal frame member 24 and are supported on their other ends by their respective ones of the main rollers 17.

Figure 3:
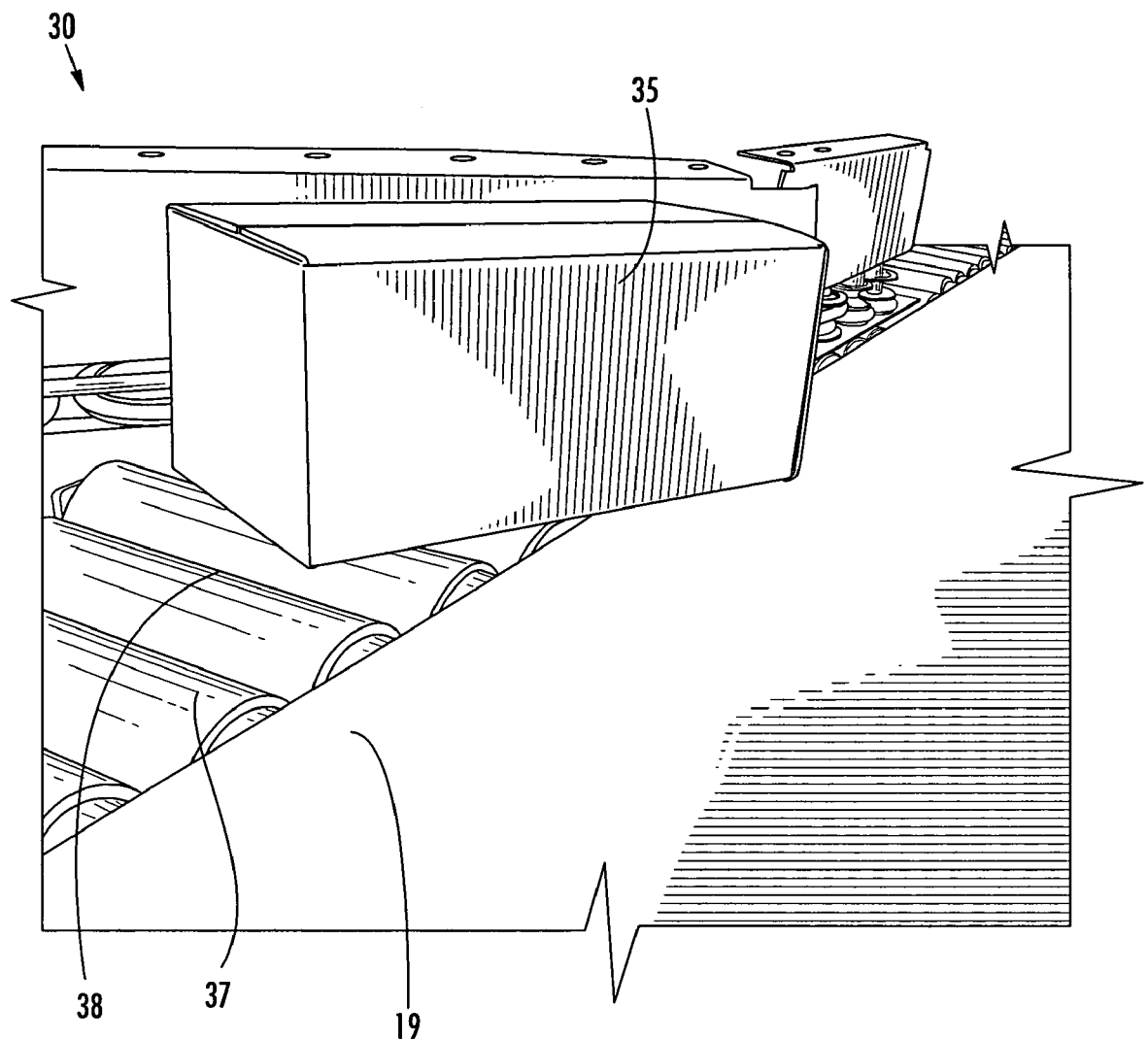
FIG. 3 shows an object merging from the saw-tooth merge area onto a belt of the conveyor system shown in FIG. 1.

In another aspect, the sawtooth rollers 17 are coated with a coating 37, such that the diameter of the plurality of sawtooth rollers 17 is greater than the diameter of the main rollers 17 and thereby defines a coated sawtooth conveying surface 38, as shown in FIG. 3. Preferably, the coating 37 has a thickness similar to the thickness 22 of the conveyor belt 19 so that the sawtooth conveying surface 38 is substantially coplanar with the top conveying surface 20. Preferably the material composition of the coating 37 has a coefficient of friction sufficiently high to allow the sawtooth conveying surface 38 to convey the objects 35 supported thereon with minimal slip. For example, a rubber, a urethane, PLASTIZOL, or some other pliant material with "sticktion" characteristics is preferable for the coating 37.

Advantageously, the gripping characteristics of the coating 37 and the increased thickness to match the thickness of the conveyor belt 19 facilitate a smooth transition between the sawtooth rollers 26 and the top surface 20 of the conveyor belt, as shown in FIG. 3. Of course, in cases where the conveyor belt 19 is not supported by the main rollers 17 and/or the sawtooth rollers 26 are not integrally connected to the main rollers, the height of the conveyor belt and rollers can be adjusted for a smooth transition between sawtooth conveying surface 38 and the top conveying surface 20. In another example, the sawtooth conveying surface 38 can be created by increasing the diameter of the plurality of sawtooth rollers 26 such that there is no need for a coating 37. As another alternative, the thickness of the coating 37 may be slightly greater than the thickness 22 of the conveyor belt 19 to facilitate bridging a gap D between the coating 37 and the conveyor belt 19, as also shown in FIG. 3.

Figure 4:
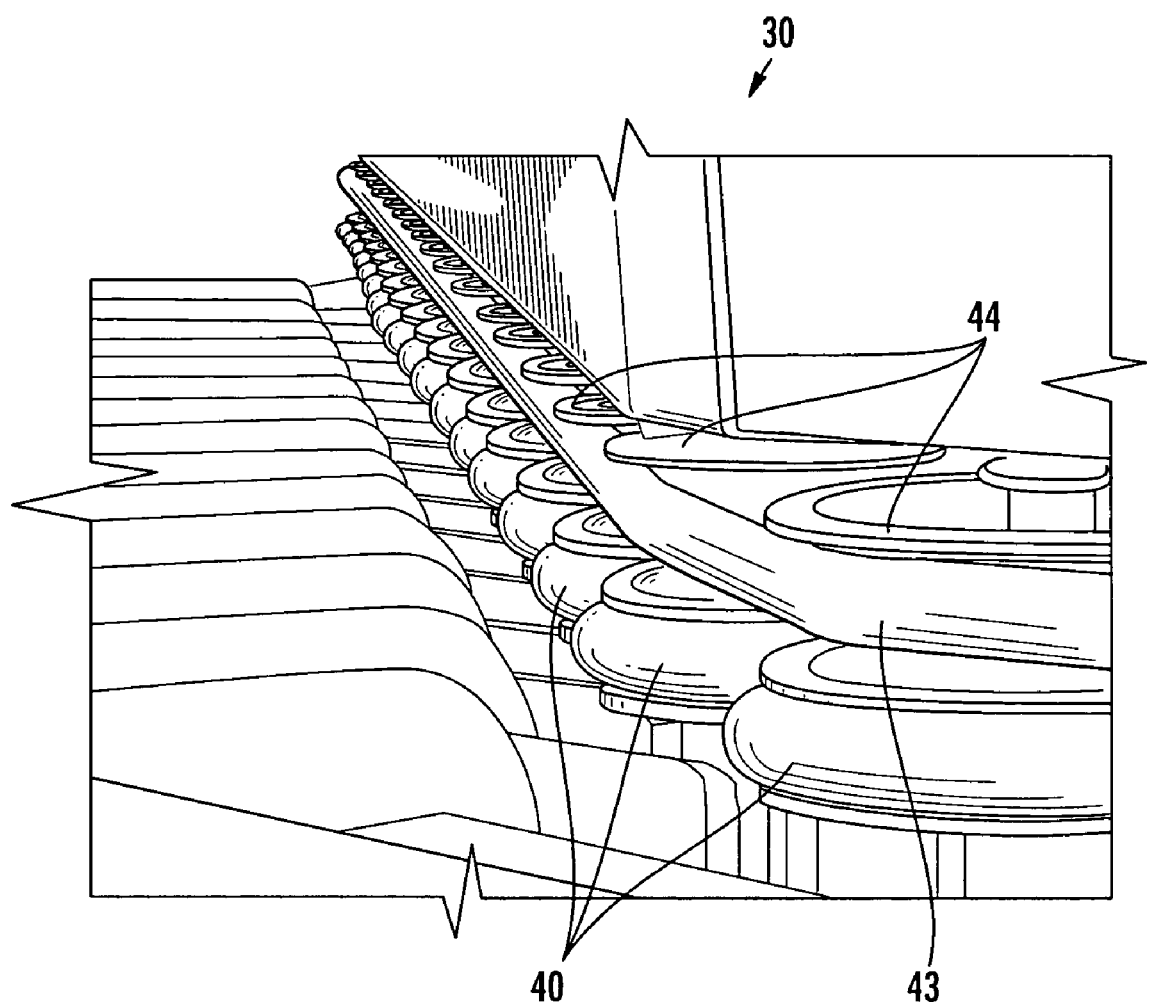
FIG. 4 shows a perspective view of a guide rail of the conveyor system of FIG. 1 including a plurality of positively driven guide rollers.

In another aspect of the conveyor system 10 of the present invention, the guide rail 30 of the sawtooth entry portion 13 further includes an urging device, shown by example in the depicted embodiment as a plurality of guide rollers 40, as shown in FIGS. 4 and 5. In particular, the plurality of guide rollers 40 are rotatably mounted via bearings within slots defined along the guide rail 30 so as to extend horizontally beyond a guide rail surface 48. Extension of the guide rollers beyond the guide rail surface allows the guide rollers 40 to contact objects moving along the guide rail 30.

Although in various embodiments the guide rollers 40 may passively rotate, the plurality of guide rollers 40 of the illustrated embodiment are driven by a guide roll drive pulley system 41, as shown in FIG. 5. The guide roll drive pulley system 41 includes a plurality of guide roller pulleys 44 that are coupled to the plurality of guide rollers 40 and are also horizontally oriented. The guide roll drive pulley system 41 also includes a primary guide roll pulley belt 42 and a secondary guide roll pulley belt 43. The primary guide roll pulley belt 42 is wound around a main conveyor pulley 45 that is mechanically connected to a drive shaft of one of the plurality of main rollers 17 that extends through an opening in the subjacent side walls 16.

The other end of the primary guide roll pulley belt 42 is wound around one of the plurality of guide roller pulleys 44. Because in the illustrated embodiment the plurality of guide roller pulleys 44 are oriented horizontally and the main conveyor pulley 45 is oriented vertically, at least one idler pulley 46 changes the direction of the primary guide roll pulley belt 42. At one end, the secondary guide roll pulley belt 43 is wound around the same of the plurality of guide roller pulleys 44 and extends the length of the guide rail 30 such that it is wound around another of the plurality of guide roller pulleys 44 and the secondary guide roll pulley belt contacts all of the intervening guide roller pulleys 44 contained in the guide rail 30. The contact with the plurality of guide roller pulleys 44 is such that the plurality of guide rollers 40 rotate and are driven by one of the main rollers 17. Additional idle or motivated guide rollers 40 may extend along one or both of sides of the conveyor system 10, along with guide rails 30 to facilitate movement and centering of the objects 35.

In the illustrated embodiment, the drive system of the main conveyor portion 11 advantageously also drives the guide roll drive pulley system 41. Alternatively, however, the guide roll drive pulley system 41 can also have its own dedicated drive system, such as its own motor and chain drive, or belt drive, or a motor coupled to and driving the pulleys of the illustrated guide rail pulley system. It should also be noted that in various embodiments, other urging devices, whether active, passive or both, may be used, such as, for example, rollers, belts, levers, pulleys, etc.

The supply conveyor 14 includes a driven belt 48 that is supported by a merging conveyor frame 49. The conveyor belt 48 defines a supply conveyor surface 50 that is preferably positioned so as to be substantially coplanar with the sawtooth conveyor surface 38 and abuts the merge conveyor end 31. This positioning facilitates the transfer of objects 35 from the supply conveyor surface onto the sawtooth conveying surface 38.

During operation, the supply conveyor 14 supplies the differently sized objects 35 to the sawtooth entry portion 13, as shown in FIG. 1. The rotation of the sawtooth rollers 26 and grip of the coating 37 motivates the objects in the direction of the adjacent, downstream guide rail 30 and the guide rollers 40 supported thereby facilitate movement therealong onto the conveyor belt 19, as shown in FIG. 3. Once the objects are on the conveyor belt 19, the belt conveys the objects, typically regardless of size, weight, shape, etc., at relatively similar speeds and spacing downstream along the conveyor path with little or no slippage.

The conveyor system of the present invention has several advantages that improve control of the positioning and movement of varying objects 35 on sawtooth conveyors. For example, the conveyor system uses the conveyor belt 19 as the main conveying surface in lieu of rollers. The conveyor belt 19 reduces slip of the objects, especially when constructed of a relatively high friction material. The coating 37 on the sawtooth rollers 26 provides additional grip for the objects 35 and the increased thickness of the coating minimizes hang up of the objects when moving from the entry portion 13 to the conveyor belt 19. The guide rail 30 and its guide rollers 40 provide additional urging to the objects 35 to ensure steady progress toward the conveyor belt 19. Objects 35 that have entered the entry portion 13 and are driven toward the guide rail 30 are urged along the guide rail 30, as opposed to contacting and dragging against the guide rail. Driving the guide rollers 40 with the same drive system driving the main conveyor portion obviates the need for a dedicated drive system for the guide rollers.

Many other modifications and embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A conveyor for moving a plurality of objects, said conveyor comprising:
   a support frame;
   a plurality of main rollers supported by the frame, said plurality of main rollers defining a conveying path and a plurality of entry rollers defining at least one entry portion, said entry portion positioned adjacent to the conveying path and angled with respect to the conveying path; and
   a belt extending over at least a portion of the plurality of main rollers defining the conveying path and configured to convey the objects along the conveying path;
   wherein the plurality of entry rollers comprise extensions of at least a portion of the plurality of main rollers and wherein the entry portion is configured to receive objects and to convey the objects onto the belt for conveying along the conveying path.

2. A conveyor of claim 1, wherein the belt defines a conveying surface and wherein the entry rollers defining the entry portion also define a conveying surface and wherein said conveying surfaces have substantially coplanar adjacent surface portions.

3. A conveyor of claim 2, wherein at least one of the entry rollers defining the entry portion includes a surface coating.

4. A conveyor of claim 3, wherein the belt has a thickness substantially the same as the surface coating.

5. A conveyor of claim 4, wherein said entry portion includes at least one guide rail extending along an outer edge of the entry portion and angled with respect to the conveying path.

6. A conveyor of claim 5, wherein said guide rail includes an urging device configured to urge objects abutting the guide rail onto the belt.

7. A conveyor of claim 6, wherein said urging device includes a plurality of positively driven guide rollers.

8. A conveyor of claim 7, wherein said guide rollers extend toward the belt from the guide rail.

9. A conveyor of claim 8, wherein said guide rollers are slave driven by at least one of the plurality of main rollers defining the conveying path.

10. A conveyor for moving a plurality of objects, said conveyor comprising:
   a support frame;
   a belt defining a conveying path and configured to convey the objects along the conveying path; and
   a plurality of entry rollers supported by the frame, said plurality of entry rollers defining at least one entry portion, said entry portion positioned adjacent to the conveying path and angled with respect to the conveying path;
   wherein the entry portion is configured to receive the objects and to convey the objects onto the belt for conveying along the conveying path; and
   wherein the belt defines a conveying surface and wherein the entry rollers defining the entry portion also define a conveying surface and wherein said conveying surfaces have substantially coplanar adjacent surface portions.

11. A conveyor of claim 10, wherein at least one of the entry rollers defining the entry portion includes a coating.

12. A conveyor of claim 11, wherein the belt has a thickness substantially the same as the coating.

13. A conveyor of claim 12, wherein said entry portion includes at least one guide rail.

14. A conveyor of claim 13, wherein said guide rail comprises a plurality of positively driven guide rail rollers.

15. A conveyor for moving a plurality of objects, said conveyor comprising:
   a support frame;
   a belt defining a conveying path and configured to convey the objects along the conveying path; and
   a plurality of entry rollers supported by the frame, said plurality of entry rollers defining at least one entry portion, said entry portion positioned adjacent to the conveying path and angled with respect to the conveying path wherein the entry portion is configured to receive the objects and to urge the objects onto the belt for conveying along the conveying path; and
   at least one guide rail extending along an outer edge of the entry portion and including an urging device configured to urge objects abutting the guide rail onto the belt.

16. A conveyor of claim 15, wherein said urging device includes a plurality of positively driven guide rollers.

17. A conveyor of claim 16, wherein the guide rollers extend inward toward the belt from the guide rail.

18. A conveyor of claim 17, wherein said guide rollers are slave driven by at least one of the plurality of entry rollers defining the entry portion.

19. A method of merging a plurality of objects, the method comprising:
   receiving the objects onto an entry portion defined by a plurality of entry rollers which comprise extensions of at least a portion of a plurality of main rollers, the entry rollers extending away from an edge of a conveyor belt defining at least a portion of a conveying path;
   conveying the objects over the entry portion, over the edge of the conveyor belt and onto the conveyor belt using the plurality of main rollers; and
   conveying the objects along the conveying path using the conveyor belt.

20. A method of claim 19, wherein conveying the objects over the entry portion includes conveying the objects over a coating on the entry rollers having a thickness approximating a thickness of the conveyor belt and wherein the entry rollers are integral extensions of a plurality of main rollers supporting the conveyor belt.

21. A method of claim 19, further comprising conveying objects along a guide rail of the entry portion by rotating a plurality of guide rollers.

* * * * *